United States Patent [19]

Poole

[11] Patent Number: 4,592,620

[45] Date of Patent: Jun. 3, 1986

[54] DISPLAY UNITS FOR AIRCRAFT

[75] Inventor: Brian H. Poole, Cheltenham, England

[73] Assignee: Smiths Industries Public Limited Company, London, England

[21] Appl. No.: 696,216

[22] Filed: Jan. 29, 1985

[30] Foreign Application Priority Data

Feb. 18, 1984 [GB] United Kingdom ............... 8404314

[51] Int. Cl.$^4$ .............................................. G02B 27/10
[52] U.S. Cl. ................................... 350/174; 248/900
[58] Field of Search ............. 350/174; 248/478, 479, 248/484, 900, 549; 340/705; 356/252

[56] References Cited

U.S. PATENT DOCUMENTS

| 3,503,146 | 3/1970 | Woplin | 350/174 |
| 3,511,465 | 5/1970 | Morion | 350/174 |
| 3,614,314 | 10/1971 | Rossire | 350/174 |
| 3,620,601 | 11/1971 | Waghorn et al. | 350/174 |
| 3,945,716 | 3/1976 | Kinder | 356/252 |
| 4,188,090 | 2/1980 | Ellis | 350/174 |

FOREIGN PATENT DOCUMENTS

| 1332433 | 10/1973 | United Kingdom . |
| 2031610A | 4/1980 | United Kingdom . |
| 2042206A | 9/1980 | United Kingdom . |
| 2088079A | 6/1982 | United Kingdom . |

Primary Examiner—Jon W. Henry
Attorney, Agent, or Firm—Pollock, Vande Sande and Priddy

[57] ABSTRACT

An aircraft head-up unit includes a collimator that is automatically swung upwards out of the pilot's ejection envelope by an actuator, driven by gas pressure from an ejector seat mechanism. The collimator is supported by a first frame, and the actuator is supported by a second frame on which the first frame is pivotally mounted. The frames are held in position by spring detents, which can be overcome by an upward or downward impact. The collimator has a concave surface bearing a holographic element and is mounted below the pilot's line-of-sight, with a CRT display. A reflector, mounted above the line-of-sight, reflects a display image from the CRT display, through a combiner, to the collimator. The collimator reflects the display image to the combiner which directs it into the pilot's line-of-sight.

10 Claims, 3 Drawing Figures

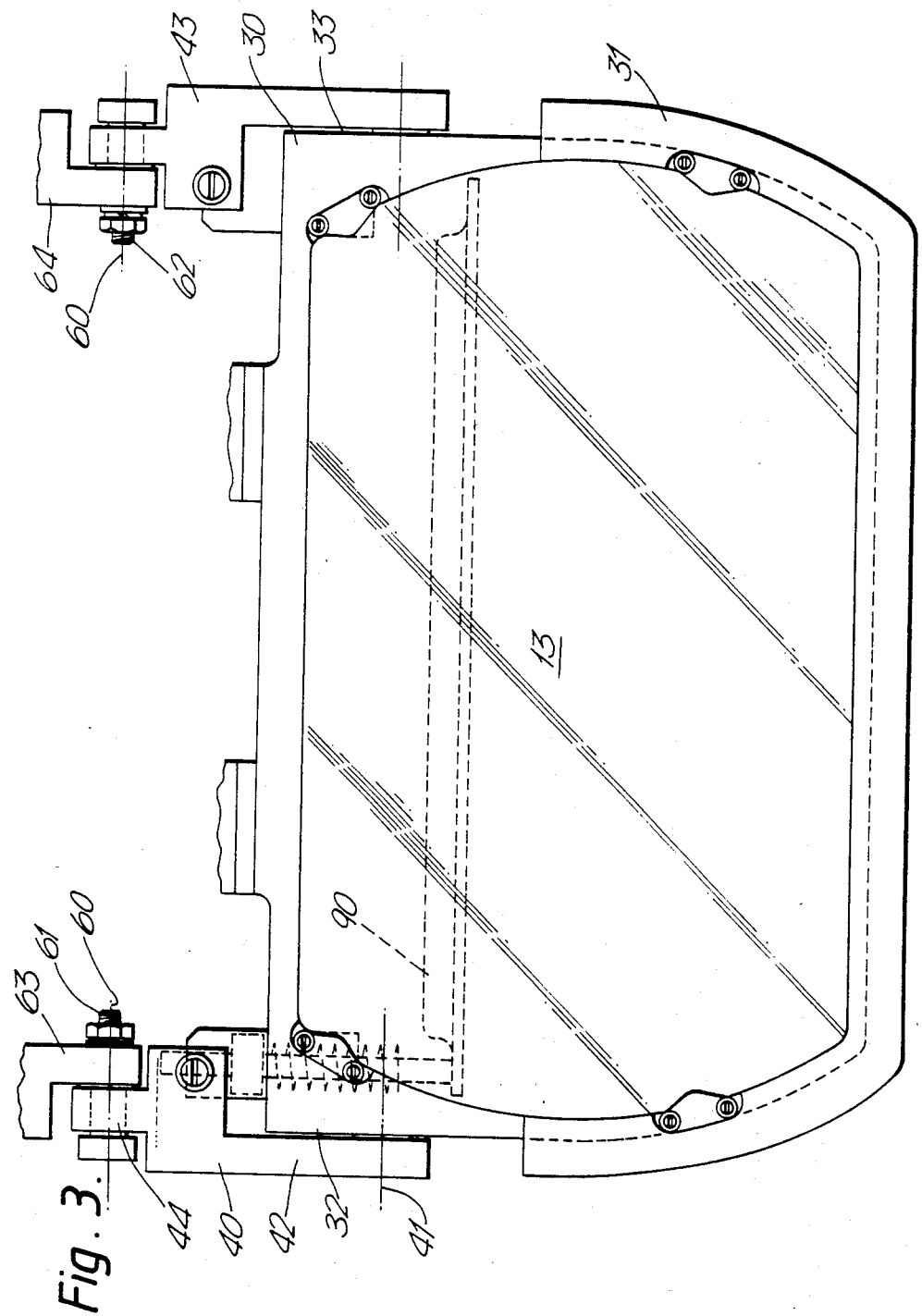

DISPLAY UNITS FOR AIRCRAFT

BACKGROUND OF THE INVENTION

This invention relates to aircraft display units.

The invention is more particularly concerned with head-up display units.

Head-up display units are used in aircraft to present the pilot with a display image superimposed on the pilot's normal field-of-view through the aircraft canopy. Such display units usually have a cathode-ray tube display on which flight information is presented. An optical lens, holographic element, or mirror is used to collimate the display on the screen of the cathode-ray tube. A combiner taking the form of a semi-transparent mirror or holographic element, is used to direct the collimated image into the line-of-sight of the pilot. The pilot can thereby look through the combiner at the external scene and at the same time be presented with the fight information focused at infinity.

In order to ensure that the field-of-view provided by the head-up display is as large as possible, the display unit is located as close to the pilot as possible, and the display optics are also as large as possible. The size and location of the head-up display unit must, however, not be such as to impede safe entrance and exit from the aircraft by the pilot. It is especially important that safe ejection by the pilot is not restricted in any way, and that the display unit does not present the pilot with any hazard during a crash. Because of these considerations, head-up display units are generally mounted in the aircraft cockpit further from the pilot than would be desirable in order to provide the pilot with a large field-of-view.

BRIEF SUMMARY OF THE INVENTION

It is an object of the present invention to provide an aircraft display unit that may be located close to the pilot, while allowing safe and unrestricted entry to and exit from the aircraft.

According to one aspect of the present invention there is provided an aircraft display unit including means arranged to display an image, and an optical system arranged to project the image into the field-of-view of a user, the optical system including at least one optical element that is arranged for displacement during entrance or exit from the aircraft by the user.

In this way it is possible to locate the optical elements of the unit in the desired optical position without the danger of an optical element providing an obstacle to free entry and exit from the aircraft.

The unit preferably includes actuator means that is arranged to displace the optical element automatically on ejection of the user from the aircraft. The actuator means may be arranged to be actuated by gas pressure from an ejector seat mechanism, and may be a pyrotechnic actuator. The optical element may be mounted on a first frame and the actuator means mounted on a second frame, the first frame being pivotally mounted on the second frame, the second frame being pivotally mounted with the unit, and the actuator means being arranged to displace the first frame relative to the second frame on ejection. The first frame may be arranged for displacement upwardly by the actuator means, the second frame being arranged for displacement downwardly by a downward force on the first frame. The first frame may be pivotally mounted and arranged for upward displacement by an upward force on the first frame caused by impact with the user, and the first frame may be mounted for pivotal movement on the second frame about a first axis, the said second frame being mounted with the unit for pivotal displacement about a second axis parallel to and displaced from the first axis. The unit preferably includes a detent, which may be mounted on the second frame, arranged to retain the first frame in location until the first frame is acted on by a force sufficient to overcome the detent. The unit may include a detent that is arranged to retain the second frame in location until the second frame is acted on by a force sufficient to overcome the detent. The optical element may be collimator means such as a reflecting collimator comprising a concave surface bearing a holographic element. Alternatively, the optical element may be a combiner. The display means is preferably mounted on one side of the line-of-sight of the user and is arranged to direct radiation to first reflecting means located on the other side of the line-of-sight, the first reflecting means being arranged to reflect radiation through combiner means to second reflecting means located on the said one side of the line-of-sight, and the said second reflecting means being arranged to direct radiation to the combiner means such that the combiner means directs an image of the display into the line-of-sight and towards the user. The display means and the second reflecting means are preferably mounted below the line-of-sight, and the said first reflecting means is mounted above the line-of-sight. The second reflecting means may extend generally horizontally, and may be pivotally mounted about an axis towards a side of the second reflecting means away from the user.

A head-up display unit installed in an aircraft cockpit, in accordance with the present invention, will now be described, by way of example, with reference to the accompanying drawings.

BRIEF DESCRIPTION OF THE DRAWINGS

FIG. 3 is a plan view of the unit shown in FIG. 2.

DETAILED DESCRIPTION

Figure 1:
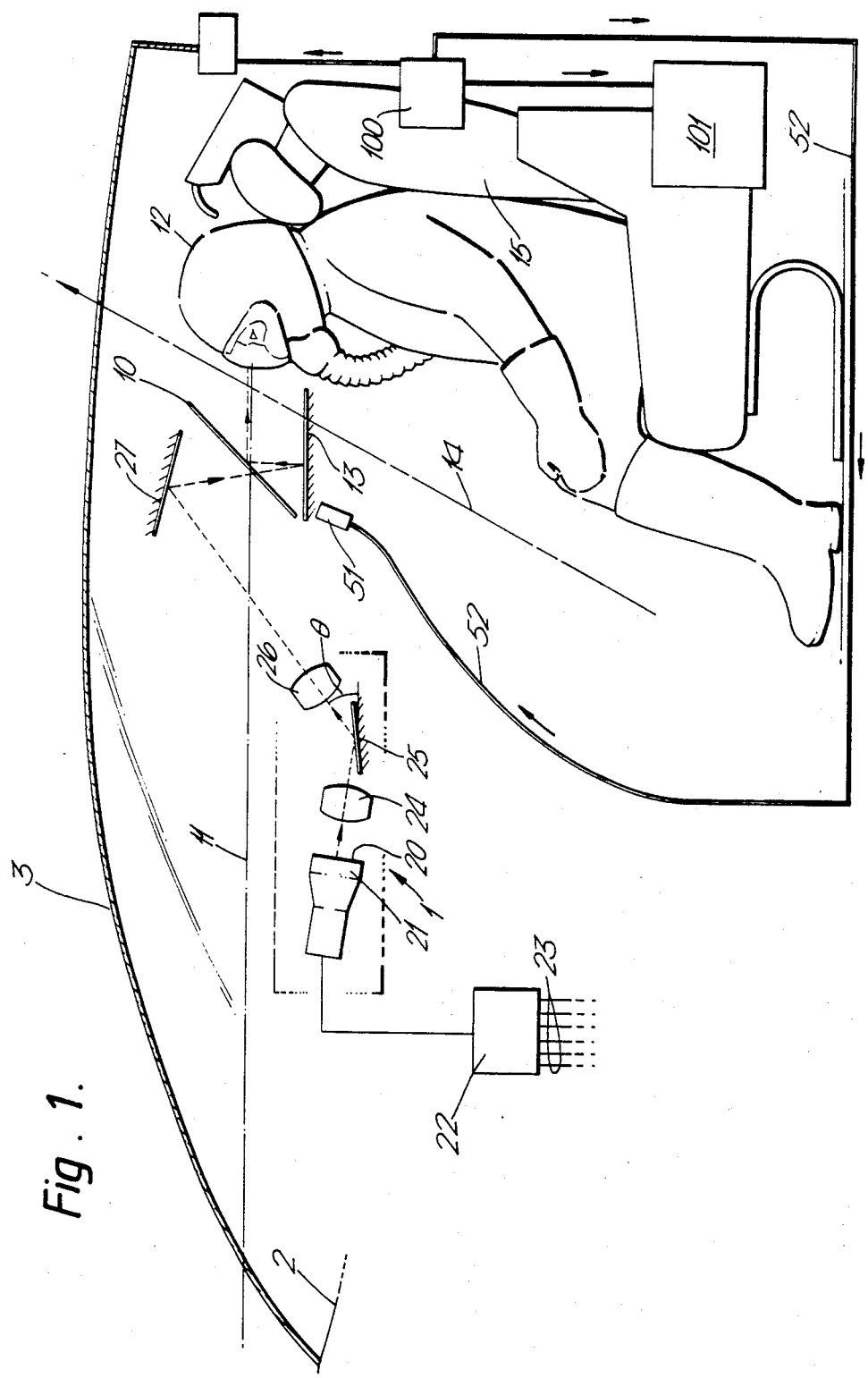
FIG. 1 shows an aircraft cockpit schematically, including a head-up display unit.

With reference to FIG. 1, there is shown a head-up display unit 1 mounted in an aircraft cockpit 2. The head-up display unit 1 has a combiner element 10 mounted in the line-of-sight 11 of the aircraft's pilot 12. The display unit 1 has a reflecting collimating element 13 that normally projects within the ejection envelope 14 of the pilot's ejection seat 15, but which is automatically stowed to a safe position, outside the ejection envelope, on ejection.

Aircraft flight, or other, information is presented on the screen 20 of a cathode-ray tube 21 in response to electrical signals from a graphics generator 22. The graphics generator 22 receives various inputs on lines 23 from different transducers and sensors (not shown). The optical system of the display unit 1 comprises, in order from the screen 20: a first optical lens assembly 24, a first plane mirror 25, a second optical lens assembly 26, a second plane mirror 27, the collimating element 13, and the combiner 10. The cathode-ray tube 21, the first and second lens assemblies 24 and 26, and the first plane mirror 25 are each mounted below the line-of-sight 11 of the pilot 12. The inclinations of the screen 20 and the first plane mirror 25 are such that light from the screen is reflected upwardly at an angle θ of about 60° to the horizontal towards the second mirror 27. The second mirror 27 is fixedly mounted above the combiner 10 and is inclined such that light from the screen is reflected downwards through the combiner 10 onto the collimating element 13. The collimating element 13 is provided by a concave surface with a holographic coating, although it could be a concave mirror. The optical power of the collimating element 13 is such that, together with the action of the lens assemblies 24 and 26, the image of the screen 20 is focussed at infinity. The inclination of the collimating element 13, in normal use, is approximately parallel to the line-of-sight 11 and is such that light from the mirror 27 is reflected upwardly by the collimating element to the combiner 10. The combiner 10 is a holographic element (although a semi-reflective mirror can be used) the inclination of which is chosen to direct radiation from the collimating element 13 towards the pilot 12 along his line-of-sight 11. In this way, the pilot can view the flight information on the screen 20 and the external scene, by looking through the combiner 10. The inclination of the mirror 27 is such that it only presents a small obstacle in the field-of-view of the pilot.

Figure 2:
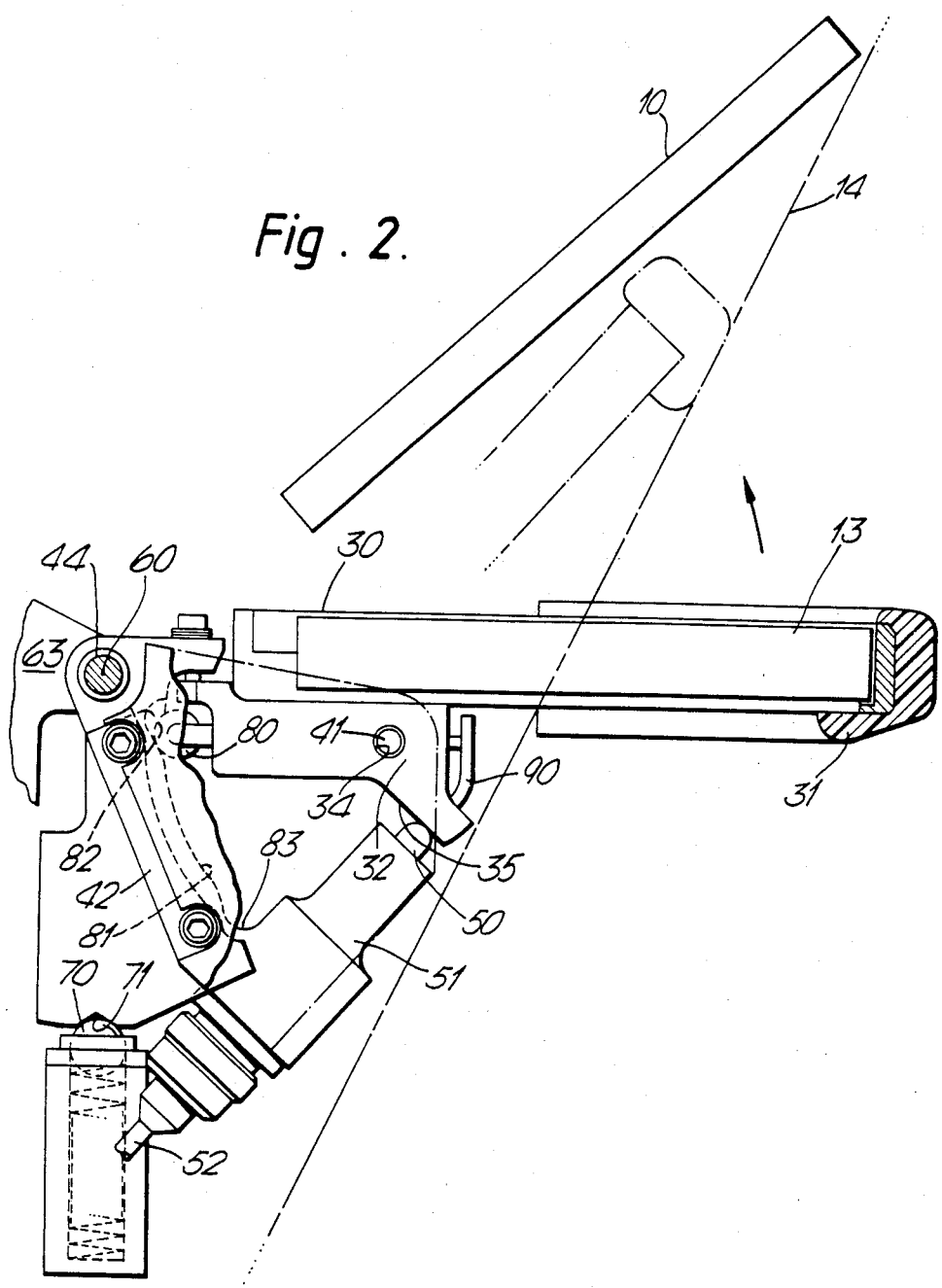
FIG. 2 shows a part of the head-up display unit in elevation, to a larger scale.

With reference now also to FIGS. 2 and 3, it will be seen that the collimating element 13 is of generally rectangular shape with its shorter sides being curved. The collimating element is supported by a metal eject frame 30 around its edge, and is provided with padding 31 round its forward end, that is, the edge closer the pilot. The frame 30 is formed, towards its rear, with two shoulders 32 and 33 which projects downwardly on opposite sides. Each shoulder 32 and 33 has a mounting aperture 34 by which the eject frame 30 is mounted on a second, impact frame 40 for rotation about a horizontal eject axis 41.

Each shoulder 32 and 33 has an inclined face 35 which is engaged by the piston 50 of a respective gas-operated actuator 51. The actuators 51 are connected by a gas line 52 to the aircraft ejection mechanism 100 (FIG. 1). When the pilot pulls the ejection handle (not shown), this pulls a link in the ejection seat breach which causes the cockpit canopy 3 to be jettisoned and gas to be supplied along the gas line 52. Following a built-in delay, the main seat ejection system 101 is activated. This built in delay, which may typically be 0.3 seconds, allows the canopy 3 to jettison clear of the cockpit, and the actuator 51 to force the piston 50 outwards thereby causing anticlockwise rotation (as seen in FIG. 2) of eject frame 30. This causes the collimating element 13 to be swung upwardly about the eject axis 41 to the position shown by the broken lines in FIG. 2. In this position the collimating element 13 is stowed close to the combiner element 10, out of the ejection envelope 14.

The eject frame 30 also enables the collimating element 13 to be displaced by an upward blow, such as from the pilot's knees, in the event that the actuator 51 fails. The eject frame 30 carries two spring-loaded bearings or detents 80 which project from the lower side of the rear of the frame. Each bearing 80 engages a profiled track 81 formed in respective side plates 42 and 43 of the impact frame 40. In the normal, horizontal location of the collimating element 13, each bearing 80 locates in a curved recess 82 at the upper end of the track 81. When the forward edge of the collimating element 13 is forced upwards, by the actuator 51 or by a blow from the pilot's knees, the resilience of the bearing 80 is overcome thereby allowing the eject frame 30 to be rotated about the axis 41 until the bearing locates in a similar curved recess 83 at the lower end of the track 81. The forward end of each bearing 80 is connected with a parking handle 90 which extends between the two bearings beneath the collimating element 13. By pulling on this handle 90, the pilot can withdraw the bearings 80 from location in the recess 82 thereby allowing the collimating element 13 to be swung freely to its vertical position. With the collimating element in this position entry and exit from the cockpit is made easier.

The impact frame 40 is arranged to enable the collimating element 13 to be displaced by a downward blow, such as from the pilot's head. The two side plates 42 and 43 of the impact frame 40 are located outwardly of the eject frame 30 and are of generally triangular shape being pivoted about an apex 44. A line joining the pivot point 44 of opposite plates 42 and 43 defines an impact axis 60 which is parallel to the eject axis 41 and located rearwardly of it. The impact frame 40 is held in its normal position, with the collimating element 13 generally horizontal, by means of two sprung detents 70. Each detent 70 engages a triangular slot 71 in the outer edge of the respective impact frame plates 42 and 43. The impact frame 40 is pivoted about the axis 60 by means of bolts 61 and 62 which extend through arms 63 and 64 of the display unit housing 65. The housing 65 is securely mounted in the aircraft cockpit 2.

If the collimating element 13 is struck a downwards blow by the pilot's head, such as during a crash, the holding force of the detent 70 will be overcome and the impact frame 40 and the eject frame 30 with the collimating element 13 will be rotated clockwise (as viewed in FIG. 3) about the impact axis 60, to a downwards position.

In this way, a relatively large collimating element can be used, and the display unit mounted close to the pilot, without risk of danger to the pilot on ejection or during a crash.

Instead of using a gas-operated actuator, a pyrotechnic actuator may be used. In such an arrangement the force by which the collimating element is displaced is derived from a small ballistic cartridge. The ballistic cartridge is detonated by applying a suitable current. The current may be derived from a thermal battery.

It will be appreciated that the present invention could also be used to cause safe displacement of, for example, a combiner element instead of a collimating element.

What I claim is:

1. A display unit for an aircraft of the kind having an ejector seat that can be ejected out of the aircraft within an ejection envelope, the display unit including display means, mounting said display means forwardly of the user outside the ejection envelope to provide a display of an image to the user, and an optical system that projects the image from the display means into the field-of-view of the user, said optical system including an optical element that, in use, extends into the region of the said ejection envelope, and actuator means operable to displace said optical element relative to said display means away from the ejection envelope in response to operation of the ejector seat so as thereby to facilitate safe ejection of the user.

2. An aircraft display unit according to claim 1, wherein the said actuator means is driven by gas pressure from an ejector seat mechanism.

3. An aircraft display unit according to claim 1, including a first frame that supports the said optical element; a second frame, the first frame being pivotally mounted on the second frame; means mounting the actuator means on the second frame such that, on actuation, the actuator means engages the first frame and displaces the first frame relative to the second frame in a first direction; and means pivotally mounting the second frame with the unit, the second frame being displaceable in a second direction opposite to said first direction by a force in said second direction on said first frame.

4. An aircraft display unit according to claim 3, including first detent means operable to retain said first frame until actuation of said actuator or impact with said first frame by sufficient force to overcome said first detent means.

5. An aircraft display unit according to claim 3, including second detent means operable to retain said second frame until impact with said first or second frame by sufficient force to overcome said second detent means.

6. An aircraft display unit according to claim 1, wherein the said optical element includes collimator means.

7. An aircraft display unit according to claim 7, wherein the said optical element is a reflecting collimator comprising a concave surface bearing a holographic element.

8. An aircraft display unit according to claim 1, including first reflecting means, second reflecting means, and combiner means, the said combiner means being mounted in a line-of-sight of the user, the said display means and the said second reflecting means being mounted on one side of the line-of-sight, and the first reflecting means being mounted on the opposite side of the line-of-sight, said first reflecting means being located to reflect the display image from the display means through the combiner means to the second reflecting means, said second reflecting means being located to reflect the display image from the first reflecting means to the combiner means, said combiner means being located to direct an image of the display from the second reflecting means into the line-of-sight and towards the user.

9. An aircraft display unit according to claim 8, wherein the said second reflecting means is a reflecting collimator, and wherein the second reflecting means is the said optical element mounted for displacement away from the ejection envelope.

10. An aircraft display unit for displaying an image to a user, the unit comprising display means that provides a display of the image, and an optical system that projects the image from the display means into the field-of-view of the user, wherein the unit includes collimator means; a first frame that supports the collimator means; a second frame; means pivotally mounting the first frame on the second frame; means pivotally mounting the second frame with the unit for downward displacement of the second frame by a downward impact on said first frame; actuator means; means mounting the actuator means on the second frame; and means coupling the actuator means to an ejector seat mechanism such that said actuator means engages the said first frame and displaces the first frame upwardly on ejection.

* * * * *